Orain

[54] HOMOKINETIC JOINT ALLOWING A LARGE ANGULAR DISPLACEMENT

[75] Inventor: Michel Orain, Conflans Sainte Honorine, France

[73] Assignee: Glaenzer Spicer, Poissy, France

[21] Appl. No.: 880,488

[22] Filed: Feb. 23, 1978

[30] Foreign Application Priority Data

Mar. 4, 1977 [FR] France ................................ 77 06427

[51] Int. Cl.² .............................................. F16D 3/30
[52] U.S. Cl. ............................................. 64/21; 64/8
[58] Field of Search .................................. 64/21, 7, 8

[56] References Cited

U.S. PATENT DOCUMENTS

| | | | |
|---|---|---|---|
| 2,286,498 | 6/1942 | Miller | 64/21 |
| 3,107,505 | 10/1963 | Koss | 64/21 |
| 3,298,201 | 1/1967 | Cadiou | 64/21 |
| 3,338,070 | 8/1967 | Scott | 64/21 |
| 3,464,232 | 9/1969 | Hutchinson | 64/21 |
| 3,792,596 | 2/1974 | Orain | 64/8 |
| 4,004,435 | 1/1977 | Rubin | 64/8 |

Primary Examiner—Charles J. Myhre
Assistant Examiner—R. C. Turner
Attorney, Agent, or Firm—Wenderoth, Lind & Ponack

[57] ABSTRACT

The joint comprises a first member defining a tripod connected to a first shaft and forming three trunnions. Part-spherical rollers are respectively slidably and rotatably mounted on the trunnions. A second member connected to a second shaft defines three raceways in which the rollers are received. The raceways are each formed by a pair of part-circular sectioned grooves the mean line of which is an arc of a circle centered preferably in the vicinity of the axis of the second shaft. The tripod is rigid with a shaft section which has, in a zone close to the tripod, a substantially triangular cross-sectional shape approximately constituting the envelope of the free edge of the second member when the joint operates with an angular displacement of the first and second shafts close to the maximum possible angle.

11 Claims, 6 Drawing Figures

FIG_1

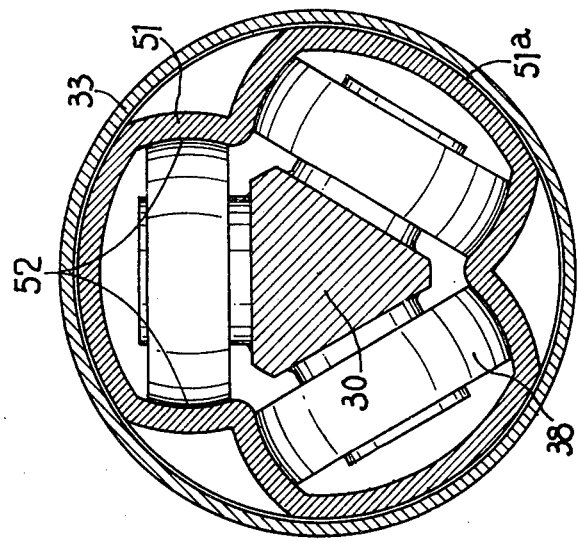
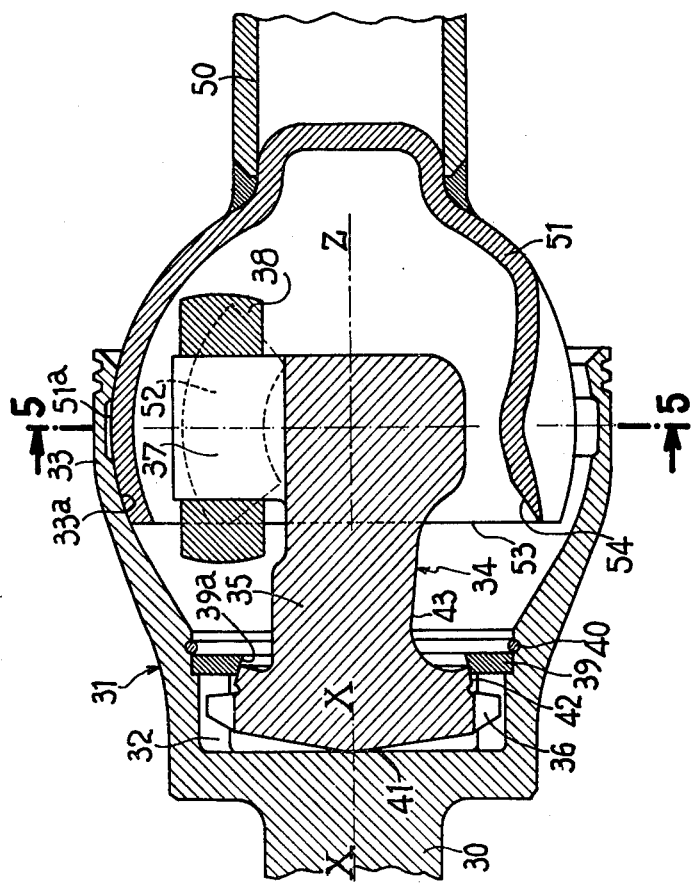

HOMOKINETIC JOINT ALLOWING A LARGE ANGULAR DISPLACEMENT

The present invention relates to homokinetic joints or couplings for transmissions, of the type comprising a member in the form of a tripod connected to one of two shafts, or other respectively driving and driven means, and defining three trunnions on which are rotatably and slidably mounted part-spherical rollers received in raceways defined in a second member connected to the other of said shafts. It is known that among homokinetic joints, the joints of this type have the feature of having no device bisecting the angle made by the axes of the two joined or coupled shafts so that there result great simplicity of joint construction and joint strength which are most appreciated from the point of view of joint life and cost of production.

In order to achieve with such joints angular displacements between the shafts exceeding 30°, use has been made heretofore of a version in which the tripod is driven by the ends of its trunnions which are fixed inside a bowl-shaped member integral with the associated shaft. The other member or bell which carries the raceways and is rigid with the other shaft, is then received inside this bowl. Owing to this relative arrangement of the bell inside the bowl, there is given to the bowl an outside diameter distinctly larger than the diameter of the bell so as to avoid interferences between these two members in the course of the large angular displacement of the shafts. Further, the large magnitude of this angular displacement requires the provision in the bell of deep notches which considerably weaken it and reduce the transmissible torque. Further, it is necessary to limit the diameter of the rollers to avoid increasing the width of the notches which would weaken the bell still more. Consequently, the torque-transmitting capacity of such a joint is distinctly lower for a given overall size than that of tripod joints having a small angular displacement in which the tripod is driven by a shaft fixed internally in its hub.

The main object of the invention is to provide a tripod joint which is capable of operating with a large angular displacement or operating angle and has a torque-transmitting capacity for a given overall size which is distinctly increased relative to that of joints usually employed for the same applications.

This result is achieved in a homokinetic joint of the aforementioned type in which each raceway is formed by a pair of grooves having a part-circular section the mean line of which grooves is an arc of a circle centered preferably in the vicinity of the axis of the second shaft, wherein the tripod shaped member is rigid with a shaft section which has in a zone close to the tripod a substantially triangular cross-sectional shape approximately constituting the envelope of the free edge of the member defining the raceways when the joint operates at an angle close to its maximum angle of operation.

According to other features:

in each one of three zones between the three raceways the member defining the raceways has along its free edge portion three cut-away faces which extend obliquely toward the interior of said member;

in the known manner, the rollers have a large diameter and the adjacent grooves pertaining to two consecutive raceways are almost secant;

in a particularly advantageous embodiment, the tripod is connected to its associated shaft by an auxiliary coupling allowing a relatively small angular displacement between the axis of the tripod and the axis of the shaft, said shaft and the member defining the raceways comprising complementary centering and axial retaining means.

The invention will be described in more detail hereinafter with reference to the accompanying drawings which are given solely by way of example and in which:

FIG. 4 is a longitudinal sectional view of a more elaborate second embodiment;

FIG. 5 is a sectional view taken on line 5—5 of FIG. 4, and

Figure 1:
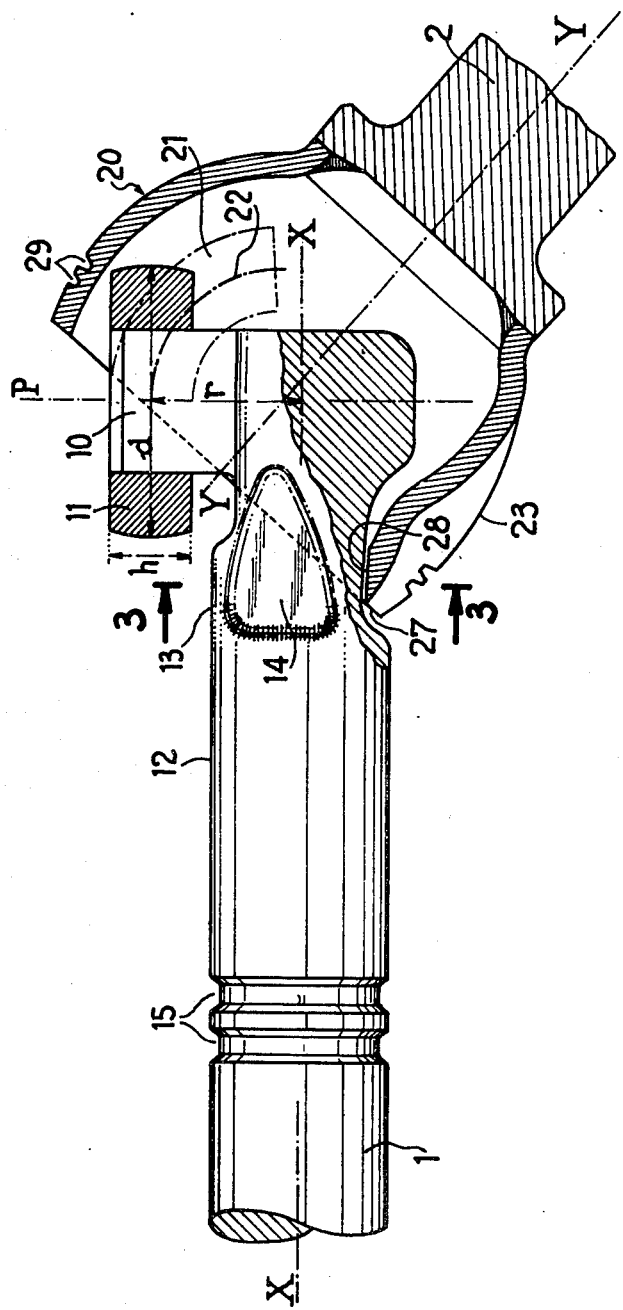
FIG. 1 is a longitudinal sectional view of a first embodiment of a joint according to the invention.
Figure 2:
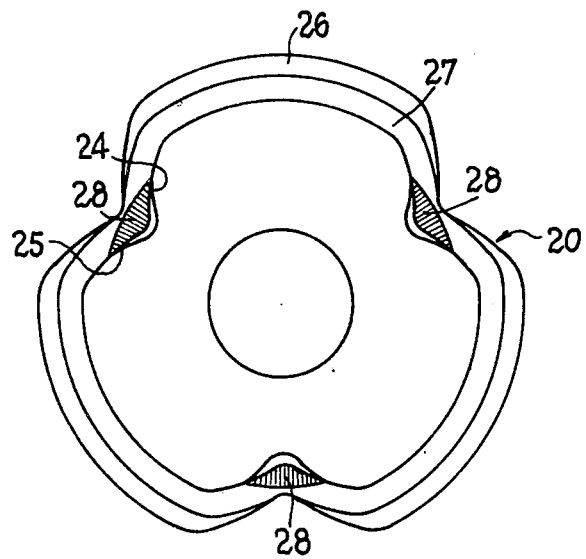
FIG. 2 is an end elevational view of the member defining the raceways.
Figure 3:
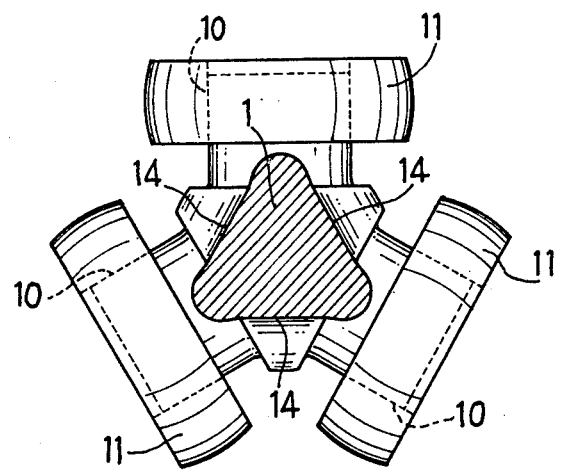
FIG. 3 is a sectional view taken on line 3—3 of FIG. 1 of one of the members of the joint.

Reference will first be made to FIGS. 1 to 3 to describe a first embodiment of a tripod-type homokinetic joint according to the invention.

This joint or coupling is adapted to couple two shafts 1, 2 namely a driving shaft and a driven shaft. The first shaft has an axis X—X and forms a tripod structure and carries at one end three trunnions 10 the axes of which are disposed at 120° to each other and are contained in a common radial plane perpendicular to the axis of the shaft 1. Mounted on each of these journals is a part-spherical roller 11 whose diameter d is relatively large with respect to its length h and with respect to the distance r between the centre of the roller and the axis of the shaft 1.

The shaft 2 has an axis Y—Y and is integral with a bell or shell 20 in which are defined raceways 21 for the rollers. The raceways have a roughly toric shape and are each formed by a pair of grooves having a part-circular cross-sectional shape. The mean line of the grooves is an arc of a circle 22 which is preferably centered in the vicinity of the axis of the shaft 2. In the presently-described embodiment, the bell is constructed by a forming operation on a blanked-out sheet which is shaped in such manner as to define the raceways, the envelope of its outer surface 23 being on the whole spherical, which results in a particularly small overall size. It can be seen from an examination of FIG. 2 that the raceways are such that the grooves 24, 25 of two adjacent raceways are almost secant along their inner edges without the strength of the bell being correspondingly affected, bearing in mind that connecting or bridging zones 26 exist between the two grooves or rolling surfaces of the same raceway.

Provided in the zones between two adjacent raceways and along the free edge 27 of the bell, are cut-away faces or chamfered zones which can be seen at 28 in FIGS. 1 and 2. This particular shape results from the fact that the line of contact of the part-spherical rollers 11 with the toric raceways 21 is contained in a plane P containing the centres of the roller and torus. Consequently, the edge of the raceway intersects the mean line 22 of the raceway at an angle of 90° and the axis Y—Y of the bell at an angle of the order of 45°. This constitutes an interesting clearance which avoids interference with the zone 12 of the shaft 1 in the case of an angular displacement of the shafts of the joint in the direction opposed to that shown in FIG. 1.

As can be seen in FIGS. 1 and 3, in the zone 13 of the shaft 1 close to the trunnions 10, this shaft has a shape which corresponds to the envelope of the free edge 27 of the bell when the joint operates at its maximum angle of displacement as shown in FIG. 1. This gives the shaft a substantially triangular sectional shape the corners of which are rounded (FIG. 3) and it will be observed that the three axes of symmetry of this triangle are parallel to the axes of the trunnions 10. Each flat face or cavity 14 corresponding to one of the sides of the triangle preferably has a contour in the form of a curvilinear triangle of variable depth. Indeed, this zone 13 of the shaft 1 constitutes in part the envelope of the cut-away faces 28 of the bell and the conjugation of these shapes has for effect to increase the allowed angular displacement of the joint without however substantially adversely affecting the strength of the shaft.

Such a joint can operate with a maximum angular displacement of the order of 42° with a particularly high torque-transmitting capacity. An illustration thereof will be given hereinafter.

The shaft 1 and the bell 20 moreover have grooves 15, 29 for the mounting of a sealing bellows or gaiters of elastomer (not shown) which forms a sealed enclosure for the mechanism and retains the lubricant.

The rollers 11 have been shown mounted by smooth bearing surfaces on their trunnions 10. It will be understood that they may be provided with needle bearings so as to improve the mechanical efficiency and reduce heat in the joint. The needles may then be retained on the trunnion by a washer which is fixed by a screw or the like.

Figure 6:
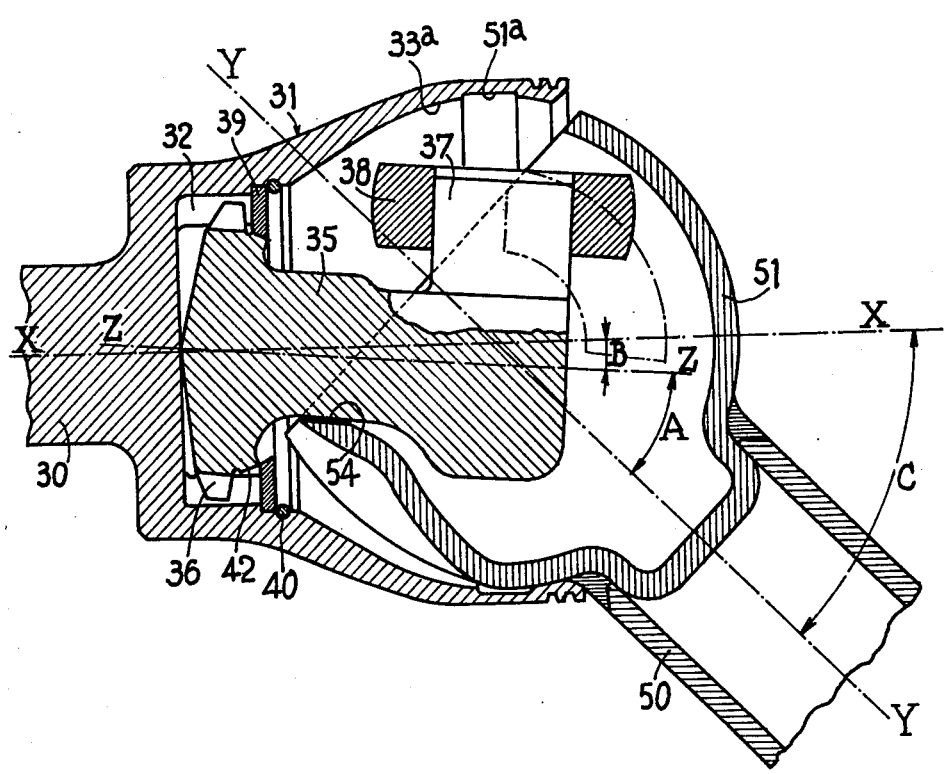
FIG. 6 is a view similar to FIG. 4 of the joint operating with its maximum angular displacement.

FIGS. 4, 5 and 6 show a more elaborate second embodiment of such a joint or coupling which allows a larger angular displacement between the two joint parts. This joint comprises a first shaft 30 carrying at its end an enlarged portion 31 defining, on one hand, inner teeth 32 and, on the other hand, a bowl structure 33 the inner surface 33$^a$ of which has a part-spherical shape. The tripod structure proper 34 is separate from this shaft and comprises a shaft section 35 defining, at one end, teeth 36 which are in mesh with the teeth 32 of the shaft 30 and, at the opposite end, three trunnions 37 on which part-spherical rollers 38 are mounted. The teeth 32 and 36 are slightly backed-off in the known manner so as to form a coupling which permits transmission of torque at small angular displacements between the axes X—X and Z—Z of the main shaft 30 and the shaft 35 of the tripod respectively.

The tripod is axially retained relative to the shaft 30 by a thrust washer 39 retained by an elastically yieldable ring 40 and furthermore bears against the end of a cavity in the shaft 30 by a roughly part-spherical bearing surface 41. The complementary surfaces 39$^a$ and 42 of the washer 39 and tripod respectively are also preferably part-spherical.

The second shaft 50 is tubular and carries a bell structure 51 defining three raceways 52 which are of toric shape as in the first embodiment and in which the rollers are received. This bell has an outer surface 51$^a$ of part-spherical shape and is received in the bowl 33 so as to ensure a perfect centering of the joint parts. Formed along the free edge portion 53 of the bell 51 in the intermediate zones between two adjacent raceways are cut-away faces 54 which are oriented roughly at 45° to the axis Y—Y of the shaft 50.

As in the preceding embodiment, in the zone 43 the shaft section carrying the tripod is shaped in such a manner as to constitute the envelope of the free edge 53 of the bell when the joint operates with the maximum angular displacement between the shafts 30 and 50, this shaft section consequently also having in this zone a substantially triangular cross-sectional shape.

This embodiment operates in the following manner:

For a maximum angular displacement between the shafts 30 and 50, the axis Y—Y of the shaft 50 makes with the axis Z—Z of the shaft 35 of the tripod an angle A which may reach 41° or 42° and the axis Z—Z makes with the axis X—X of the shaft 30 an angle B which may be of the order of 5°. The maximum angular displacement C of the joint then corresponds to the sum of the angules A and B and may therefore attain or even slightly exceed 46°.

In the two described embodiments, the joint according to the invention has a particularly small overall size and a high torque-transmitting capacity. This capacity may be illustrated by the following calculation: if the torque-transmitting capacity of a joint is calculated from the formula C=p.d.h.r.n., wherein:

p=mean allowable pressure on the projected surface of the roller in respect of steels currently employed in the manufacture of rolling bodies;

d=diameter of the rollers;

h=length of the roller or of the effective part-spherical zone;

r=distance between the centre of the roller and the axis of the joint;

n=number of rollers, in a joint of conventional design allowing a large angular displacement, such as that which has been defined in the preamble of the description and has a given overall size, there is obtained C=20,700 p, for a maximum angular displacement of 43°.

For the same overall size, a joint according to the embodiment shown in FIGS. 1 to 3 and capable of operating with a roughly equivalent maximum angular displacement (42°) has a torque-transmitting capacity C=54,400 p, whereas a joint constructed in accordance with the embodiment shown in FIGS. 4 to 6 has a torque-transmitting capacity of 41,600 p but with a much larger angular displacement (46°).

In both cases, the desired result is therefore achieved in a spectacular manner with no particular complication or increase in production costs.

It is well to mention that the cut-away faces provided in the region of the free edge of the member defining the raceways may be roughly planar or have preferably a slightly concave shape. Likewise, the flat faces of the shaft integral with the tripod, which constitute the envelope thereof, could have a concave or convex complex shape or even a shape having a double curvature, which presents no inconvenience if this shape is imparted thereto by a cold-forming operation.

Having now described our invention what we claim as new and desire to secure by Letters Patent is:

1. A homokinetic joint for a transmission comprising a driving first element having an axis of rotation, a driven second element having an axis of rotation, a first member constituting a tripod which has an axis of rotation and is connected to said first element and defines three trunnions, three part-spherical rollers respectively rotatably and slidably mounted on the trunnions, a second member connected to said second element and having a free peripheral edge and defining three raceways, each raceway being formed by a pair of grooves having a part-circular cross-sectional shape, a mean line of which grooves being an arc of a circle centered substantially in the vicinity of the axis of said second element, an element which is rigid with the tripod and has, in a zone close to the tripod, a substantially triangular cross-sectional shape approximately constituting the envelope of said free edge of the second member when the joint operates with an angular displacement between said first and second elements close to the maximum angular displacement.

2. A homokinetic joint as claimed in claim 1, wherein in three zones between the three raceways the second member has along said free edge three cut-away faces which are directed obliquely toward the interior of the second member and toward the centre of the joint.

3. A homokinetic joint as claimed in claim 2, wherein the cut-away faces are oriented substantially at 45° relative to the axis of the associated one of said elements.

4. A homokinetic joint as claimed in claim 1, wherein in said zone the element section rigid with the tripod comprises three cut-away faces the contour of which is substantially triangular.

5. A homokinetic joint as claimed in claim 4, wherein said cut-away faces define cavities.

6. A homokinetic joint as claimed in claim 1, wherein the rollers have a large diameter with respect to their length and with respect to the distance between the centre of the rollers and the axis of the associated one of said elements, and the second member comprises bridging zones between the two grooves of the same raceway.

7. A homokinetic joint as claimed in claim 1, wherein the tripod is connected to the associated one of said elements by means comprising an auxiliary coupling allowing a relatively small angular displacement between the axis of the tripod and the axis of the associated one of said elements, said associated one of said elements and the second member comprising complementary mutually centering and axial retaining means.

8. A homokinetic joint as claimed in claim 7, wherein said auxiliary coupling comprises two interengaged series of teeth, the teeth being cut back so as to be capable of operating at a certain angle.

9. A homokinetic joint as claimed in claim 7, wherein the tripod is axially retained relative to the associated one of said elements by means comprising a cavity having an inner end face defined by said associated one of said elements, a thrust washer, an elastically yieldable ring retaining the washer, and a substantially part-spherical bearing surface on the tripod by which the tripod bears against said inner end face.

10. A homokinetic joint as claimed in claim 9, wherein the washer and tripod have part-spherical complementary surfaces.

11. A homokinetic joint as claimed in claim 7, wherein the centering means comprise means defining two complementary part-spherical bearing surfaces forming a ball joint and respectively rigid with said first element and said second element.

* * * * *